United States Patent [19]

Butcher

[11] 3,861,845

[45] Jan. 21, 1975

[54] FOUR BAR LINKAGE FOR INSERTS FOR BLOW MOLDING MOLDS

[75] Inventor: Alvin E. Butcher, Bartlesville, Okla.

[73] Assignee: Phillips Petroleum Company, Bartlesville, Okla.

[22] Filed: Nov. 21, 1972

[21] Appl. No.: 308,574

[52] U.S. Cl............... 425/302 B, 425/DIG. 212, 425/DIG. 233, 425/DIG. 806, 425/387 B
[51] Int. Cl........................................... B29d 23/03
[58] Field of Search.......... 425/DIG. 203, DIG. 206, 425/DIG. 212, DIG. 233, 302 B, DIG. 806, 326 B, 387 B, DIG. 214

[56] References Cited
UNITED STATES PATENTS

| | | | |
|---|---|---|---|
| 2,283,751 | 5/1942 | Ferngren | 425/DIG. 203 |
| 3,313,875 | 4/1967 | Magerle | 425/302 B |
| 3,464,084 | 9/1969 | Thompson | 425/DIG. 806 |
| 3,594,864 | 7/1971 | Gilbert | 425/DIG. 206 |
| 3,758,254 | 9/1973 | Dean | 425/DIG. 212 |

Primary Examiner—Richard B. Lazarus

[57] ABSTRACT

In a mold for forming hollow articles by blow molding, inserts are provided in the bottom wall forming portion of the mold which are carried by a four bar linkage. Preferably the inserts are spring biased against the respective mold halves. Each of the inserts cooperates with its respective mold half, and in closed position, the inserts cooperate with each other, to form a bottom wall surface for molding the wall of an article being formed. When the mold halves are open, the inserts, in instances where the article is being blown in the right-side-up position, move axially downwardly and laterally back as the mold halves open as the result of sliding against the curved bottom wall of the molded article. Since the inserts can move downwardly, less scuffing of the bottom of the article is caused.

8 Claims, 4 Drawing Figures

PATENTED JAN 21 1975 3,861,845
SHEET 1 OF 2

FOUR BAR LINKAGE FOR INSERTS FOR BLOW MOLDING MOLDS

BACKGROUND OF THE INVENTION

This invention relates to mold means for blow molding hollow articles. In a more specific aspect, it relates to inserts in a mold adapted to seal an open end parison at orientation temperature.

The blow molding art goes back over 100 years, although it has been only in the last 15 years or so that it has achieved significant commercial success. With this commercial success has come more sophisticated blow molding techniques. These modern techniques allow blow molding hollow articles having unique shapes.

Recently a new technique has been developed whereby parison preforms are heated to orientation temperature, stretched longitudinally, and introduced into a mold cavity where they are expanded out into conformity with the walls of the mold cavity while still at orientation temperature so as to give a biaxially oriented hollow article having exceptional strength and high clarity. With this technique it is apparent that the most economical method of forming the parison preforms would be to extrude a continuous tube and cut it into work pieces as opposed to injection molding a closed end preform. However, these individual work pieces are open at each end and thus in order to take advantage of this economical method of fabrication, it is necessary to seal one end of the preform. This presents certain difficulties since the temperature at which orientation is achieved is generally 1°–50°F below the crystalline melting point of the polymer which is a temperature at which the polymer normally does not seal. One solution to this problem is to squeeze the polymer together in the seal area and sever the tail portion of the parison from the remainder of the parison so as to leave a slight tab instead of severing flush with the bottom wall of the container. This, however, necessitates the formation of an unusually deep recess of the bottom of the bottle in order to allow the bottle having this tab to sit level on a flat surface. Removing bottles with a deep bottom recess from a mold usually results in scuffing or slight deformation which can also result in "rocker" bottoms being formed if the deformation is severe enough. Such a bottle can cause trouble in the filling lines, since one tipped bottle can disrupt the entire line, and can be easily tipped over on a store shelf or at home, for example. While it is known to provide radially moving inserts actuated by air cylinders and the like, such techniques are not feasible in instances where a seal of an open end parison must be obtained in a recessed area, and in addition, such techniques do not readily lend themselves to the high-volume-high-speed operation inherent in blow molding operations.

SUMMARY OF THE INVENTION

It is an object of this invention to provide an improved blow molding mold;

It is a further object of this invention to provide improved techniques for forming bottles from open end parisons; and It is yet a further object of this invention to provide apparatus suitable for forming bottles with recessed bottoms, which apparatus is adaptable to commercial use.

In accordance with this invention, inserts are provided in the bottom wall forming portion of a blow molding mold which inserts are carried by a four bar linkage.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 2:
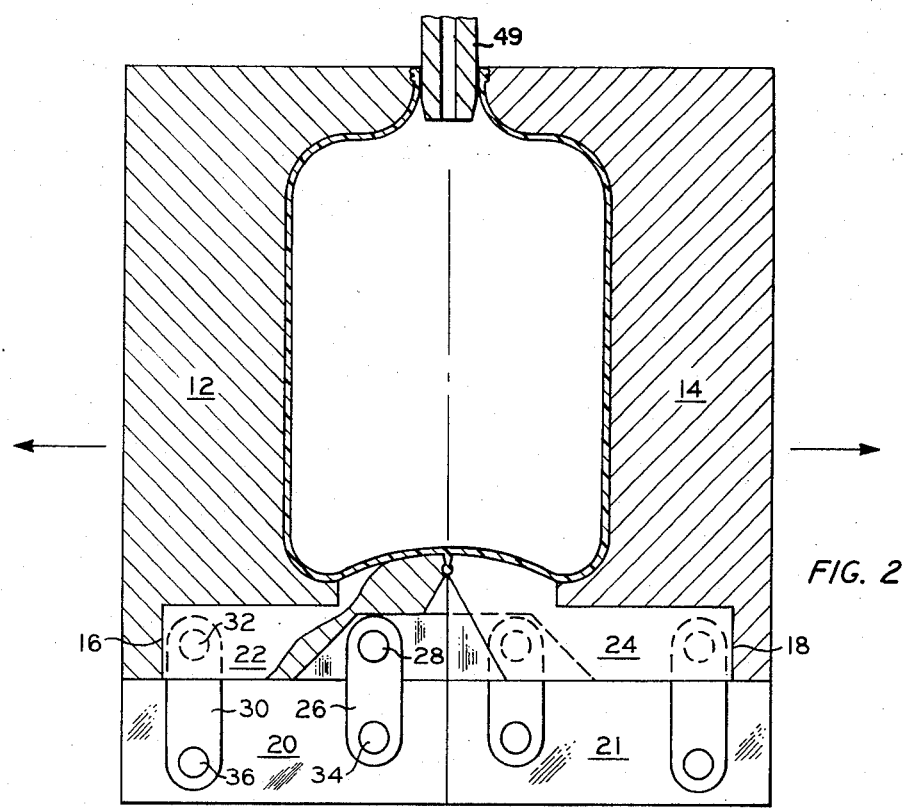
FIG. 2 is a sectional view along line 2—2 of FIG. 1.

The molds having inserts carried by a four bar linkage in accordance with the invention can be used in the fabrication of any blow molded article. However, they are of particular utility in the formation of blow molded articles such as bottles from open end tubular parison preforms which have been heated to orientation temperature. In this preferred embodiment thermoplastic materials such as polymers of at least one mono-l-olefin having 2–8 carbon atoms per molecule are extruded into a continuous tubular formation which is then immediately passed through a vacuum cooling and sizing chamber to cool the material to below the crystalline melting point thereof. This thus cooled extrudate is then cut into individual work pieces and reheated to orientation temperature which is generally 1°–50°, preferably 10°–30°F below the crystalline melting point thereof. For instance, for polypropylene, which is a preferred material, the preferred temperature is 310°–330°F. The parison while at this temperature is then stretched longitudinally and thereafter stretched circumferentially by the introduction of internal fluid pressure to cause it to conform to the shape of the mold cavity.

Each of the inserts can be returned into position within a recess in its respective mold half by springs which cause the inserts to move inwardly and laterally back into said recess preparatory to the mold closing to pinch the parison shut. At this point the inserts are preferably parallel with, or inclined slightly toward the parting line of the mold halves to lock the inserts in place against each other as the part is blown. By "inwardly" is meant an upward movement in instances where the article is molded right side up as shown in the drawings, that is inwardly toward the interior of the article. If the article were being molded upside down then the insert would be moving downwardly along a plane through the axis to return into position for pinching the next parison. Thus by "inwardly" and "outwardly" is meant the axial movement toward and away from the interior of the article and by "back" and "forward" is meant lateral movement on opening and closing the mold halves, respectively. On opening the mold halves after an article is blown, the inserts are biased back toward the mold halves by the springs but first move outwardly as a result of contacting the curved bottom wall of the article which has been formed. This avoids the severe scuffing which would occur if the inserts were rigidly attached to the respective mold halves.

The mold and related parts can be formed of any construction material standard in the industry such as steel, aluminum, and the like. Vega steel is a preferred material.

Preferably, the inserts are so contoured as to seal the walls of the parison together and thereafter sever the part of the parison attached to what is to be a bottom wall of the resulting article, from the tail portion. Preferably the severing means are spaced downwardly from the bottom wall forming portion of the mold insert a distance of one one-hundreth to one-half, preferably one thirty-second to one-eighth inch. The inserts can have an initial section adjacent a wall forming surface thereof which acts as a holding projection with a small longitudinal cavity between said holding projection and a forwardmost extension of the inserts which in the form of a knife edge results in said severing of the parison.

The inserts carried by the four bar linkage of the instant invention can be adapted for use with any conventional blow molding apparatus but are of particular utility with apparatus such as is disclosed in Turner et al. U.S. Pat. No. 3,390,426, the disclosure of which is incorporated herein by reference. The inserts carried by the four bar linkage can be used in apparatus such as shown in Turner et al. either with or without an internal tamping foot. Preferably the parison is grasped at a first end which forms the thread area and at the second end by a simple clamp means whereby it is stretched longitudinally and thereafter the inserts closed on a stretched portion adjacent said clamp means so as to seal the parison.

By varying the length of the bars, the movement of the inserts can be programmed to meet the individual needs. For the purpose of the following discussion it will be assumed that the article is being blown in an upright position as shown in the drawings and thus the term "down" means below the bottom of the resulting article although it is to be understood that the apparatus is equally applicable to operations wherein the entire apparatus is turned upside down. As the mold halves move back, the inserts move back and down (outwardly) and even can be programmed to have a movement such that the upper wall forming surface of the inserts moves along a path substantially equal to the slope of the bottom wall of the article being molded. Or the bars adjacent the forwardmost portions of the inserts can be shorter so as to cause the insert to move axially downwardly more than it moves laterally back to pull the forward end thereof outwardly out of contact with the bottom wall of the molded article.

Figure 3:
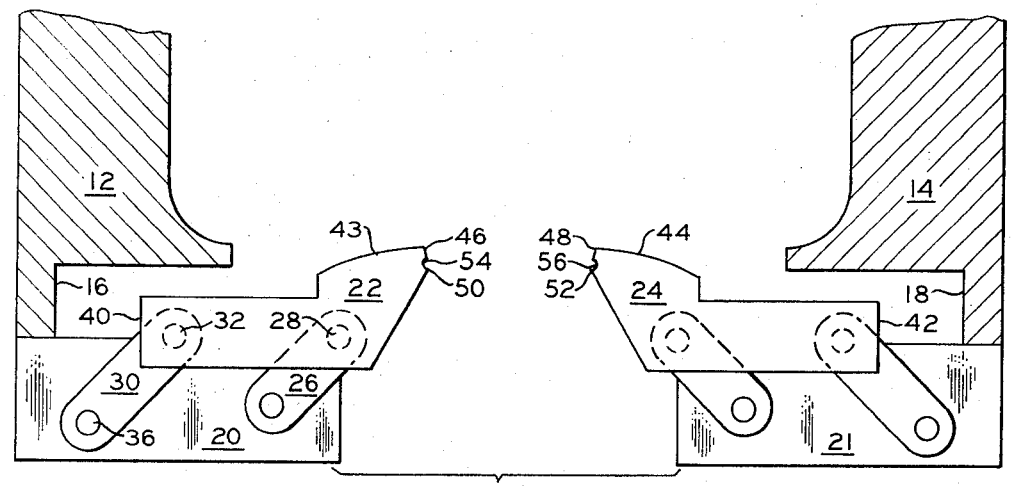
FIG. 3 is a view similar to FIG. 2 at a later stage in the operation.

Referring now to the figures, there is shown first and second blow molding mold halves 12 and 14, respectively a tapered guide tip 49 is provided on the end of an air inlet tube for guiding the parison in place and for keeping the parison walls apart. Mold halves 12 and 14 have downwardly disposed extensions thereof having recesses 16 and 18, respectively. Mold halves 12 and 14 are mounted above frame members 20 and 21 and are rigidly attached thereto. Associated with mold halves 12 and 14 are inserts 22 and 24, respectively, which are carried by four bar linkages. Referring specifically to insert 22, it is pivotally attached at a leading end thereof to a first end of a first bar 26 by means of pin 28. Insert 22 is pivotally attached at a trailing end thereof to a second bar 30 by means of pin 32. A second end of bar 26 is attached to frame 20 by means of pin 34 and the second end of bar 30 is attached to frame 20 by means of pin 36. Insert 22, bars 26 and 30 and frame member 20 constitute a four bar linkage. The other side of insert 22 is carried by two identical bars. Insert 24 is carried in a manner identical to that of insert 22. As can be seen from a view of FIG. 3, as mold halves 12 and 14 are moved laterally back to open same, inserts 22 and 24 in addition to being moved laterally back, move axially outwardly away from the bottom wall forming portion of mold halves 12 and 14, that is move downwardly as shown in the drawing along a plane through the axis of the article being fabricated. As can be seen in FIG. 3 inserts 22 and 24 have surfaces 43 and 44 forming the bottom wall of the article being manufactured. It is the slight pressure of these surfaces against the bottom wall of the molded article (not shown) that causes the inserts to move outwardly against the restraint of springs 38. Adjacent the leading ends bottom wall forming surfaces 43 and 44 are short holding projections 46 and 48. The forwardmost extension of inserts 22 and 24 are the severing edges 50 and 52. Spaced between the holding projections and the severing edges are longitudinal cavities 54 and 56 which form bead forming molds to form a tab along the seal line of the resulting article. As can be seen, the inserts are contoured so as to form a recess in the resulting article of a depth at least equal to the height of the tab being formed so that the resulting article can sit flat on a surface. After the blowing operation is completed, the mold halves are opened, and the blown object freed from the neck portion, for instance, by being moved slightly downwardly by means of a tamping foot carried by a rod coaxially disposed through said tapered guide tip.

Figure 1:
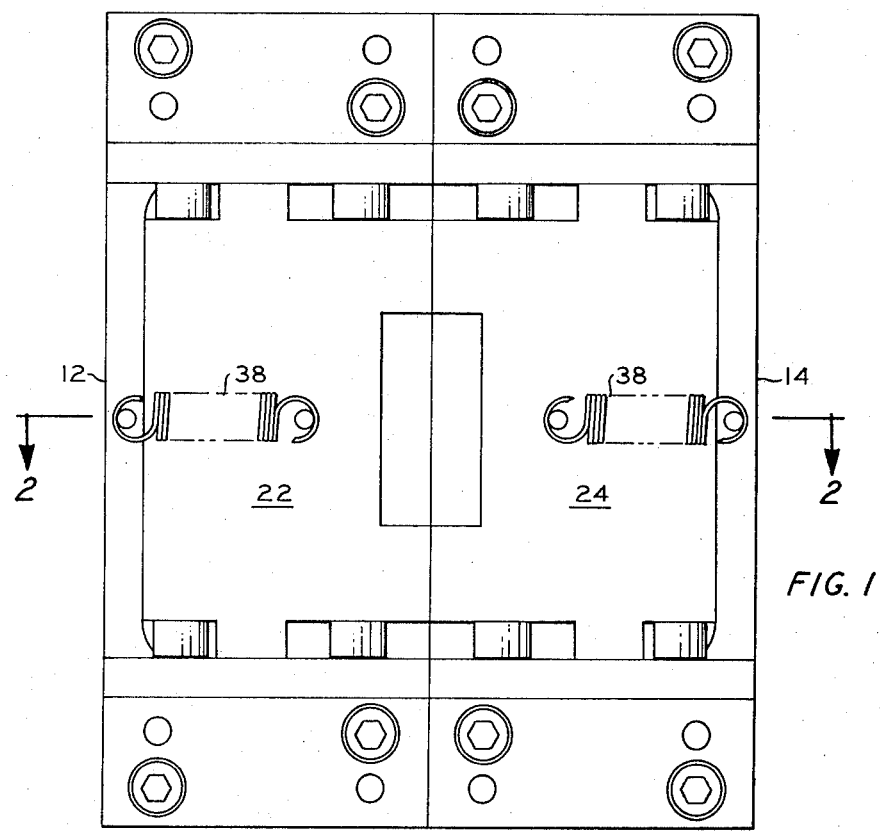
FIG. 1 is a bottom view of a blow molding mold utilizing the inserts carried by a four bar linkage.
Figure 4:
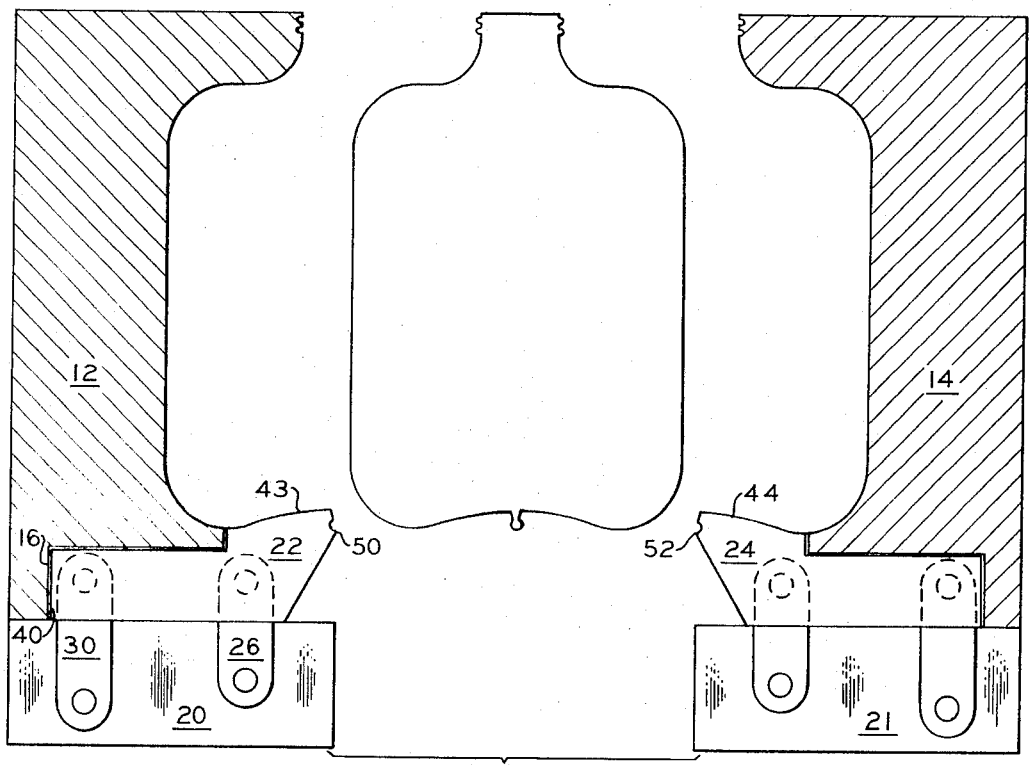
FIG. 4 is a view similar to FIG. 3 at a still later stage in the operation.

Thereafter springs 38 (FIG. 1) return inserts 22 and 24 into position for closing on a new parison as shown by FIG. 4. As the mold halves close, pressure by the mold halves against the trailing ends 40 and 42 of the inserts cause same to move forward along with the rest of the mold half to close on a new parison.

Many conventional parts such as air lines, support members, cooling channels, control systems, and the like have been omitted for the sake of simplicity, but their inclusion is understood by those skilled in the art and is within the scope of the invention.

Calculated Illustrative Embodiment

Propylene homopolymer having a density of 0.905 (ASTM D 1505-63T), and a melt flow of 3.5 (ASTM D 1238-62T, Condition L), and a crystalline melting point of about 340°F is extruded into tubing having an internal diameter of 0.8-inch and a wall thickness of about 0.125-inch. The tubing is cooled to room temperature and cut into 7-inch lengths. These 7-inch lengths are heated to a temperature of 320°-327°F. The resulting heated parison is stretched longitudinally and placed between mold halves such as those shown in the figures having inserts carried by four bar linkages. The mold halves are closed and in so doing the parison is pinched shut and severed. Internal fluid pressure is then introduced into the interior of the parison through an open neck to expand said parison into conformity with the mold. The mold is then opened with the inserts carried by the four bar linkage swinging laterally back and axially outward as a result of downward pressure exerted on the inserts by the bottom wall of the thus molded bottle to allow removal of the resulting bottle having a recessed bottom area, without damage or scuffing. After removal of the bottle, each insert is biased inwardly and back into a recess in its respective mold half preparatory to closing on the next parison. The resulting bottle demonstrates high strength and clarity imparted by the orientation. The bottom is sealed securely with a slight depending tab along the seal line. The depending tab is within the recessed portion of the bottom wall of the bottle so that the bottle sits level on a flat surface.

While this invention has been described in detail for the purpose of illustration, it is not to be construed as limited thereby but is intended to cover all changes and modifications within the spirt and scope thereof.

I claim:

1. A blow molding mold comprising in combination:

a first mold half;

an opposed second mold half adapted to come together with said first mold half along a parting line to form said mold;

a guide tip adapted to enter an open end of a tubular parison to keep the parison walls apart and aid in forming a neck of an article to be formed from said parison said guide tip being disposed between neck-forming portions of said mold halves, said guide tip further being adapted to hold said article being molded until after said mold halves are opened;

a first insert having a bottom wall forming surface which bottom wall forming surface of said first insert is adapted to cooperate with a bottom wall forming portion of said first mold half, said first insert being pivotally attached at a leading end thereof to a first end of a first bar and being pivotally attached at trailing end thereof to a first end of a second bar;

a second insert having a bottom wall forming surface which bottom wall forming surface of said second insert is adapted to cooperate with a bottom wall forming portion of said second mold half, said second insert being pivotally attached at a leading end thereof to a first end of a third bar and being pivotally attached at a trailing end thereof to a first end of a fourth bar, in closed position said bottom wall forming portions of said first and second inserts cooperating with each other to form, along with said bottom wall forming surfaces of said mold halves, a means for forming a bottom wall of said article being molded, said inserts being contoured so as to impart a substantial recess to the article being molded;

said inserts thus being adapted to move both axially along a plane through said parting line and laterally transverse to said parting line as said mold halves open so as to reduce scuffing of a bottom of said article.

2. Apparatus according to claim 1 wherein said leading ends of said inserts have an initial holding projection adjacent a bottom wall forming surface thereof, a forwardmost cutting edge and a narrow longitudinal recess between said holding projection and said cutting edge.

3. Apparatus according to claim 1 wherein each of said inserts is spring biased to cause same to return into a recess in its respective mold half prior to the time said mold halves begin to close.

4. Apparatus according to claim 1 wherein said bars attached to said forward-most ends are shorter than said bars attached to said trailing ends.

5. Apparatus according to claim 1 wherein said mold halves constitute a bottle mold.

6. Apparatus according to claim 1 wherein leading ends of said inserts have forwardmost cutting edges disposed downward from a bottom wall forming surface of said mold a distance of one thirty-second to one-eighth inch.

7. Apparatus according to claim 1 wherein said bars are of such length that a path followed by an upper wall forming surface of said inserts as said inserts are opened is approximately coextensive with the contour of the bottom surface of the article being molded.

8. Apparatus according to claim 1 wherein said bars are inclined slightly toward a parting line of said mold halves.

* * * * *